United States Patent [19]
Mandel et al.

[11] Patent Number: 4,698,780
[45] Date of Patent: Oct. 6, 1987

[54] METHOD OF MONITORING AN ELEVATOR SYSTEM

[75] Inventors: Alan F. Mandel, Mt. Lebanon; Kenneth M. Eichler, North Versailles; William J. Trosky, Wilkinsburg, all of Pa.; William H. Moore, Bridgewater, N.J.

[73] Assignee: Westinghouse Electric Corp., Pittsburgh, Pa.

[21] Appl. No.: 785,378

[22] Filed: Oct. 8, 1985

[51] Int. Cl.⁴ ...................... G06F 15/46; G06F 15/14; B66B 1/00

[52] U.S. Cl. .................................... 364/550; 364/424; 364/551; 187/29 R

[58] Field of Search ........................ 364/424, 550, 551; 340/21, 19 R

[56] References Cited

U.S. PATENT DOCUMENTS

| | | | |
|---|---|---|---|
| 3,973,648 | 8/1976 | Hummert et al. | 187/29 R |
| 4,228,513 | 10/1980 | Doljack | 364/550 |
| 4,458,788 | 7/1984 | Le Pore | 187/29 R |
| 4,512,442 | 4/1985 | Moore et al. | 187/29 R |
| 4,568,909 | 2/1986 | Whynacht | 187/29 R |
| 4,622,538 | 11/1986 | Whynacht et al. | 187/29 R |

*Primary Examiner*—Errol A. Krass
*Assistant Examiner*—Danielle B. Laibowitz
*Attorney, Agent, or Firm*—D. R. Lackey

[57] ABSTRACT

A method of monitoring an operating elevator system for malfunctions related to sequentially perform functions, including the detection of both sequence and timing errors. The method monitors predetermined signals for the detection of user defined unique events starting and stopping conditions, and it follows each state change of all of the pertinent signals which occurs between these two detected conditions. The state changes and their occurrence times relative to the start of the detected event, are compared with a learned binary image of the correct state changes and occurrence times, which correct image was prepared and stored during a learn mode when the elevator was known to correctly perform the sequence to be monitored.

7 Claims, 11 Drawing Figures

RAM MAP

INPUT TERMINALS TO BE MONITORED

| 1/1 | 1/2 | 1/3 | 1/4 | 1/5 | 1/6 | 1/7 | 1/8 | 3/9 | 3/10 | 3/11 | 3/12 | 3/13 | 3/14 | 3/15 | 3/16 |
|---|---|---|---|---|---|---|---|---|---|---|---|---|---|---|---|
| START CONDITION | | | | | | | | | | | | | | | |
| 1 | | | | | | 0 | | 0 | | | | | | 1 | |
| STOP CONDITION | | | | | | | | | | | | | | | |
| | | 1 | | | | | 0 | | | | 0 | | | | 1 |
| TMAX | | | | | | | | | | | | | | | |
| 02:00:00 | | | | | | | | | | | | | | | |

FIG. 3

| RAM MAP | |
|---|---|
| INPUT SIGNALS-LAST CHANGE (LC) | |
| INPUT SIGNALS-LATEST READING (LR) | |
| EVENT COUNT | |
| ERROR COUNT | |
| RUN FLAG | ERROR FLAG |
| STATE COUNT | |
| STATE TIMER | |

FIG. 5

RAM MAP
LEARNED STATES

| STATE | TIME | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 1 | 00:00:00 | 1 | 0 | 0 | 0 | 1 | 1 | 0 | 1 | 0 | 1 | 1 | 0 | 0 | 0 | 1 | 0 |
| 2 | 00:01:18 | 1 | 0 | 0 | 0 | 1 | 1 | 1 | 1 | 0 | 1 | 1 | 0 | 0 | 0 | 1 | 0 |
| 3 | 00:02:43 | 1 | 0 | 0 | 0 | 1 | 1 | 1 | 1 | 1 | 1 | 1 | 0 | 0 | 0 | 1 | 0 |
| 4 | 00:19:05 | 1 | 0 | 0 | 1 | 1 | 1 | 1 | 1 | 1 | 1 | 1 | 0 | 0 | 0 | 1 | 0 |
| 5 | 00:37:11 | 1 | 0 | 0 | 1 | 1 | 1 | 1 | 1 | 1 | 1 | 1 | 1 | 0 | 0 | 1 | 0 |
| 6 | 01:01:36 | 1 | 0 | 0 | 1 | 1 | 1 | 1 | 1 | 1 | 1 | 1 | 1 | 0 | 0 | 1 | 1 |
| 7 | 01:01:37 | 0 | 0 | 0 | 1 | 1 | 1 | 1 | 1 | 1 | 1 | 1 | 1 | 0 | 0 | 1 | 1 |
| 8 | 01:01:52 | 1 | 0 | 0 | 1 | 1 | 1 | 1 | 1 | 1 | 1 | 1 | 1 | 0 | 0 | 1 | 1 |
| 9 | 01:38:14 | 1 | 0 | 0 | 1 | 1 | 1 | 1 | 1 | 1 | 1 | 1 | 0 | 0 | 0 | 1 | 1 |
| 10 | 01:47:24 | 1 | 0 | 1 | 1 | 1 | 1 | 1 | 0 | 1 | 1 | 1 | 0 | 0 | 0 | 1 | 1 |

STATUS OF INPUTS — INPUT NO.

FIG. 6

RAM MAP
TEMPORARY STORE

| STATE | TIME | STATUS OF INPUTS | | | | | | | | | | | | | | | | |
|---|---|---|---|---|---|---|---|---|---|---|---|---|---|---|---|---|---|---|
| 1 | 00:00:00 | 1 | 0 | 0 | 0 | 1 | 1 | 0 | 1 | 0 | 1 | 1 | 0 | 0 | 0 | 1 | 0 | |
| 2 | 00:01:18 | 1 | 0 | 0 | 0 | 1 | 1 | 1 | 1 | 0 | 1 | 1 | 0 | 0 | 0 | 1 | 0 | |
| 3 | 00:02:43 | 1 | 0 | 0 | 0 | 1 | 1 | 1 | 1 | 1 | 1 | 1 | 0 | 0 | 0 | 1 | 0 | |
| 4 | 00:19:05 | 1 | 0 | 0 | 1 | 1 | 1 | 1 | 1 | 1 | 1 | 1 | 0 | 0 | 0 | 1 | 0 | |
| 5 | 00:37:11 | 1 | 0 | 0 | 1 | 1 | 1 | 1 | 1 | 1 | 1 | 1 | 1 | 0 | 0 | 1 | 0 | |
| 6 | 01:01:30 | 0 | 0 | 0 | 1 | 1 | 1 | 1 | 1 | 1 | 1 | 1 | 1 | 0 | 0 | 1 | 0 | * |
| 7 | 01:01:36 | 0 | 0 | 0 | 1 | 1 | 1 | 1 | 1 | 1 | 1 | 1 | 1 | 0 | 0 | 1 | 1 | * |
| 8 | 01:01:52 | 1 | 0 | 0 | 1 | 1 | 1 | 1 | 1 | 1 | 1 | 1 | 1 | 0 | 0 | 1 | 1 | |
| 9 | 01:38:14 | 1 | 0 | 0 | 1 | 1 | 1 | 1 | 1 | 1 | 1 | 1 | 0 | 0 | 0 | 1 | 1 | |
| 10 | 01:47:24 | 1 | 0 | 1 | 1 | 1 | 1 | 1 | 0 | 1 | 1 | 1 | 0 | 0 | 0 | 1 | 1 | |
| | INPUT NO. | 1 | 2 | 3 | 4 | 5 | 6 | 7 | 8 | 9 | 10 | 11 | 12 | 13 | 14 | 15 | 16 | |

FIG. 8

RAM MAP
TEMPORARY STORE

| STATE | TIME | STATUS OF INPUTS | | | | | | | | | | | | | | | | |
|---|---|---|---|---|---|---|---|---|---|---|---|---|---|---|---|---|---|---|
| 1 | 00:00:00 | 1 | 0 | 0 | 0 | 1 | 1 | 0 | 1 | 0 | 1 | 1 | 0 | 0 | 0 | 1 | 0 | |
| 2 | 00:01:18 | 1 | 0 | 0 | 0 | 1 | 1 | 1 | 1 | 0 | 1 | 1 | 0 | 0 | 0 | 1 | 0 | |
| 3 | 00:02:43 | 1 | 0 | 0 | 0 | 1 | 1 | 1 | 1 | 1 | 1 | 1 | 0 | 0 | 0 | 1 | 0 | |
| 4 | 00:19:05 | 1 | 0 | 0 | 1 | 1 | 1 | 1 | 1 | 1 | 1 | 1 | 0 | 0 | 0 | 1 | 0 | |
| 5 | 00:37:11 | 1 | 0 | 0 | 1 | 1 | 1 | 1 | 1 | 1 | 1 | 1 | 1 | 0 | 0 | 1 | 0 | |
| 6 | 01:01:36 | 1 | 0 | 0 | 1 | 1 | 1 | 1 | 1 | 1 | 1 | 1 | 1 | 0 | 0 | 1 | 1 | |
| 7 | 01:01:37 | 0 | 0 | 0 | 1 | 1 | 1 | 1 | 1 | 1 | 1 | 1 | 1 | 0 | 0 | 1 | 1 | |
| 8 | 01:01:52 | 1 | 0 | 0 | 1 | 1 | 1 | 1 | 1 | 1 | 1 | 1 | 1 | 0 | 0 | 1 | 1 | |
| 9 | 02:00:00 | 1 | 0 | 0 | 1 | 1 | 1 | 1 | 1 | 1 | 1 | 1 | 1 | 0 | 0 | 1 | 1 | * |
| | INPUT NO. | 1 | 2 | 3 | 4 | 5 | 6 | 7 | 8 | 9 | 10 | 11 | 12 | 13 | 14 | 15 | 16 | |

FIG. 9

METHOD OF MONITORING AN ELEVATOR SYSTEM

BACKGROUND OF THE INVENTION

1. Field of the Invention

The invention relates in general to monitoring methods useful in servicing complex systems, and more specifically to methods of monitoring an operating elevator system for the detection of malfunctions related to sequentially performed functions.

2. Description of the Prior Art

The control for elevator systems is complex due to the large number of different functions which are controlled, and due to the many different interrelationships between the functions. Some types of elevator system malfunctions are not detectable by "freezing" the system at any predetermined instant and observing the conditions of certain signals at that instant. For example, the malfunction may be an out-of-sequence operation; or, an operation, while properly sequenced, may not be performed at the correct time relative to the other functions of the sequence. Furthermore, such malfunctions may occur only intermittently, making direct observation difficult and time consuming. Thus, it would be desirable to provide a new and improved method of detecting such malfunctions, which method should be universal and flexible enough to enable it to be applied to any selected portion of an elevator system.

SUMMARY OF THE INVENTION

Briefly, the present invention is a new and improved method of monitoring any predetermined selected portion of an elevator system for the detection of malfunctions related to the associated sequentially performed functions. System signals pertinent to the portion of the system to be monitored are provided, and the specific event to be monitored is selected by providing user defined unique event starting and stopping conditions in terms of at least certain of the pertinent signals. Thus, all states of the pertinent signals are ignored until the user defined event starting conditon of certain signals is detected. Once the event starting condition is detected, all state changes of the pertinent signals are followed and stored, and the occurrence time of each state change relative to the start of the event is stored, to provide a binary image of the event.

The elevator system is first operated in a learning mode to correctly perform the sequence to be monitored, with the method learning and storing the correct binary image between the event starting and stopping conditions. Once the correct binary image is stored, the elevator system may be placed in normal operation and the monitoring method detects the occurrence of each event to be monitored, and forms a binary image of each event which is temporarily stored for a length of time sufficient to make a comparison with the stored correct binary image. A sequence error, or a timing error, is detected, and the binary image of the event having the error is stored for diagnostic purposes. For example, the learned sequence and each error sequence may be printed out for study, automatically on each occurrence, or stored until requested by the user.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 3 is a RAM map illustrating the storage of certain information obtained during the interactive procedure of FIG. 2;

FIG. 5 is a RAM map which illustrates certain of the signals which are stored during the learning mode of FIG. 4, as well as signals stored during the monitoring mode of FIG. 7;

FIG. 6 is a RAM map which illustrates the correct binary image of the learned states of the event to be monitored, which image is developed by the program of FIG. 4;

FIG. 8 is a RAM map setting forth a binary image of an event detected in the program of FIG. 7, which contains both sequencing and timing errors;

FIG. 9 is a RAM map setting forth a binary image of an event detected in the program of FIG. 7, which event persisted beyond a time TMAX.

DESCRIPTION OF THE PREFERRED EMBODIMENTS

Figure 1:
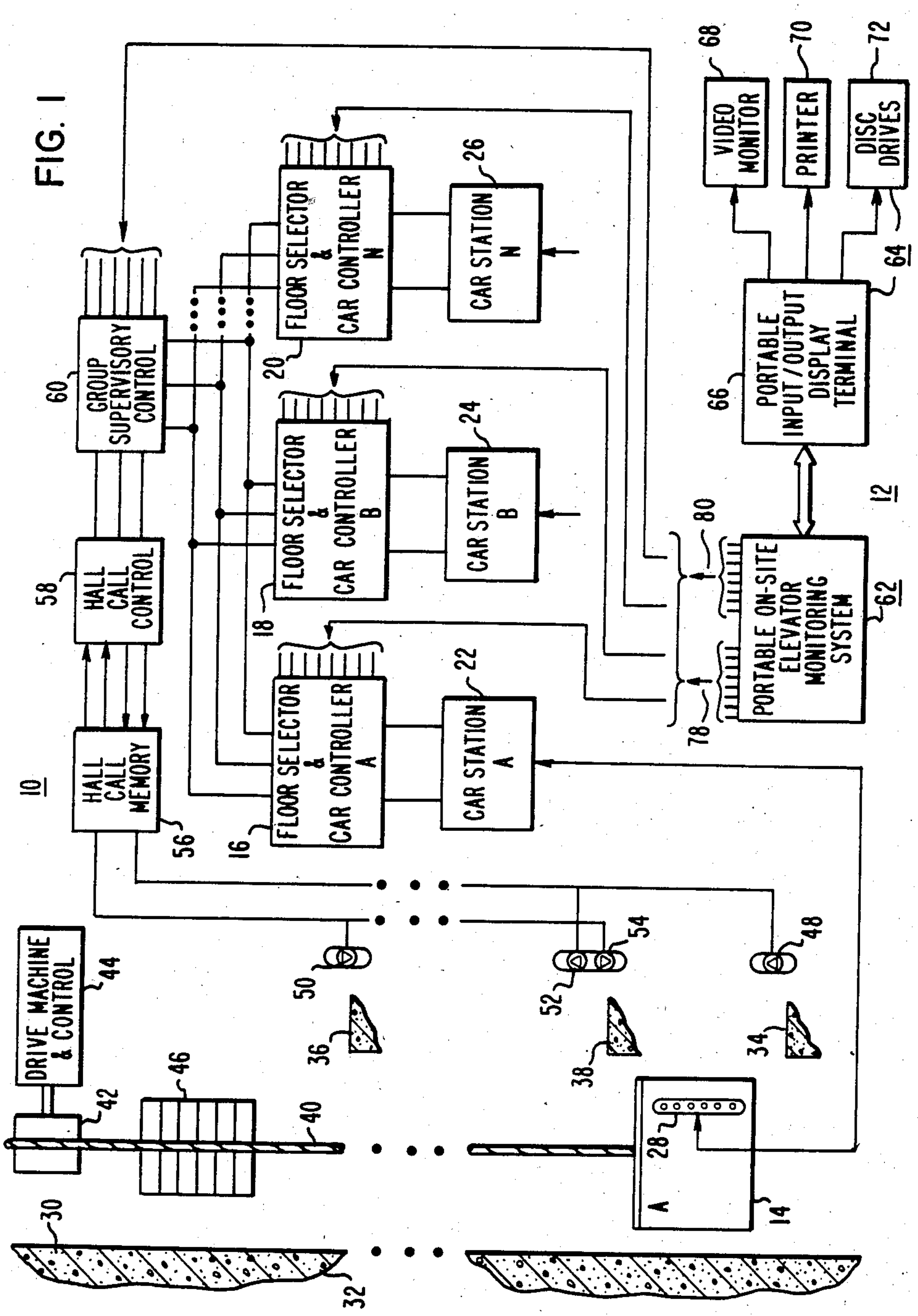
FIG. 1 is a partially schematic and partially block diagram of an elevator system which may be monitored according to the teachings of the invention.

Referring now to the drawings and to FIG. 1 in particular, there is shown an elevator system 10 being monitored by monitoring apparatus 12. The monitoring apparatus 12 may use the monitoring methods set forth by the teachings of the invention. Since the specific details of the elevator system being monitored are immaterial, elevator system 10 is shown in block form. U.S. Pat. Nos. 3,256,958; 3,741,348; 3,902,572 and 4,007,812 all set forth relay-based elevator system which may be monitored, for example. U.S. Pat. Nos. 3,750,850; 3,804,209 and 3,841,733 collectively set forth a solid state elevator system which may be monitored. Elevator system 10 may include a single elevator car, or a plurality of elevator cars under group supervisory control. The elevator cars may be hydraulically driven, or they may be of the electric traction type. For purposes of example, the controls A, B and N of a traction elevator system are illustrated, with only elevator car 14 associated with control A being shown, as the other elevator cars would be similar. The elevator controls A, B and N each include a floor selector and car controller 16, 18, and 20, respectively, usually mounted remotely from the associated elevator car, such as in a machine room. The elevator controls A, B and N also include car stations 22, 24 and 26, respectively. Each car station includes a pushbutton array located inside an elevator car for registering car calls, such as an array 28 illustrated in elevator car 14.

The elevator cars are mounted for movement in a building to serve the floors therein. For example, elevator car 14 is mounted in a hoistway 30 of the buidling 32 having a plurality of floors or landings, with only the lowest floor 34, the highest floor 36, and one intermediate floor 38, being shown in FIG. 1.

Elevator car 14 is supported by a plurality of wire ropes, shown generally at 40, which are reeved over a traction sheave 42 driven by a traction drive machine 44. A counterweight 46 is connected to the other ends of the ropes 40.

Hall calls from the various floors are registered by pushbuttons mounted in the hallways adjacent to the floor openings to the hoistway. For example, the lowest floor 34 includes an up-direction pushbutton 48, the highest floor 36 includes a down-direction pushbutton 50, and the intermediate floor 38 includes up and down pushbuttons 52 and 54, respectively. Up and down hall calls are sent to hall call memory 56, which memorizes the calls until they are reset, and it further sends the calls to hall call control 58. Hall call control 58 sends the hall calls to the group supervisory control 60.

The group supervisory control 60 using information provided to it from the various elevator cars relative to their positions and activity level, determines the allocation or assignment of the hall calls to the cars, according to a predetermined operating strategy.

Malfunctions in elevator system 10 may be car related and/or system related. While certain malfunctions are easy to diagnose, other, such as sequence and timing errors, especially if they are intermittent, are difficult and time consuming to troubleshoot. The methods of the present invention will greatly simplify servicing and troubleshooting in such sequential operations as: (a) the floor selector advance and landing cams in geared traction systems, (b) acceleration, full speed, slowdown and landing sequences in all elevator systems, (c) door operation sequences, and (d) various high speed timing sequences in solid state elevator systems.

Monitoring apparatus 12, using the servicing methods to be hereinafter described in detail, will greatly facilitate the servicing of elevator systems, as it permits the monitoring of user-defined sequences, on a continuous, 24-hour-a-day basis. Information concerning the occurrences of the user-defined events is stored, and reproduced upon command, via a user-selected mode, for easy analysis and trouble shooting. U.S. Pat. No. 4,418,795 describes the monitoring apparatus 12 in detail, and it is hereby incorporated into the present application by reference.

In general, monitoring apparatus 12 includes a first portable section 62 which remains on site during the monitoring period, and a second portable section 64. The second section 64 is used at the start of the monitoring period during the initial setup of section 62, and also at the end of the monitoring period, to communicate with section 62. Section 64 includes a portable input/output display terminal 66 having a keyboard for providing input information. Display terminal 66 additionally may include such auxiliary apparatus as a video monitor 68, a printer 70, and disc drives 72. When an elevator system is to be monitored, service personnel bring the monitoring apparatus 12 to the control room of the elevator system 10, and they interconnect the two sections 62 and 64, such as via an RS 232 data link.

The first section 62 of apparatus 12 includes a plurality of cables each having a plurality of electrical leads. For purposes of example, only two cables 78 and 80 are shown, each having a plurality of electrical leads for connection to elevator control elements, and additional ground leads, but any number of cables may be used.

Figure 2:
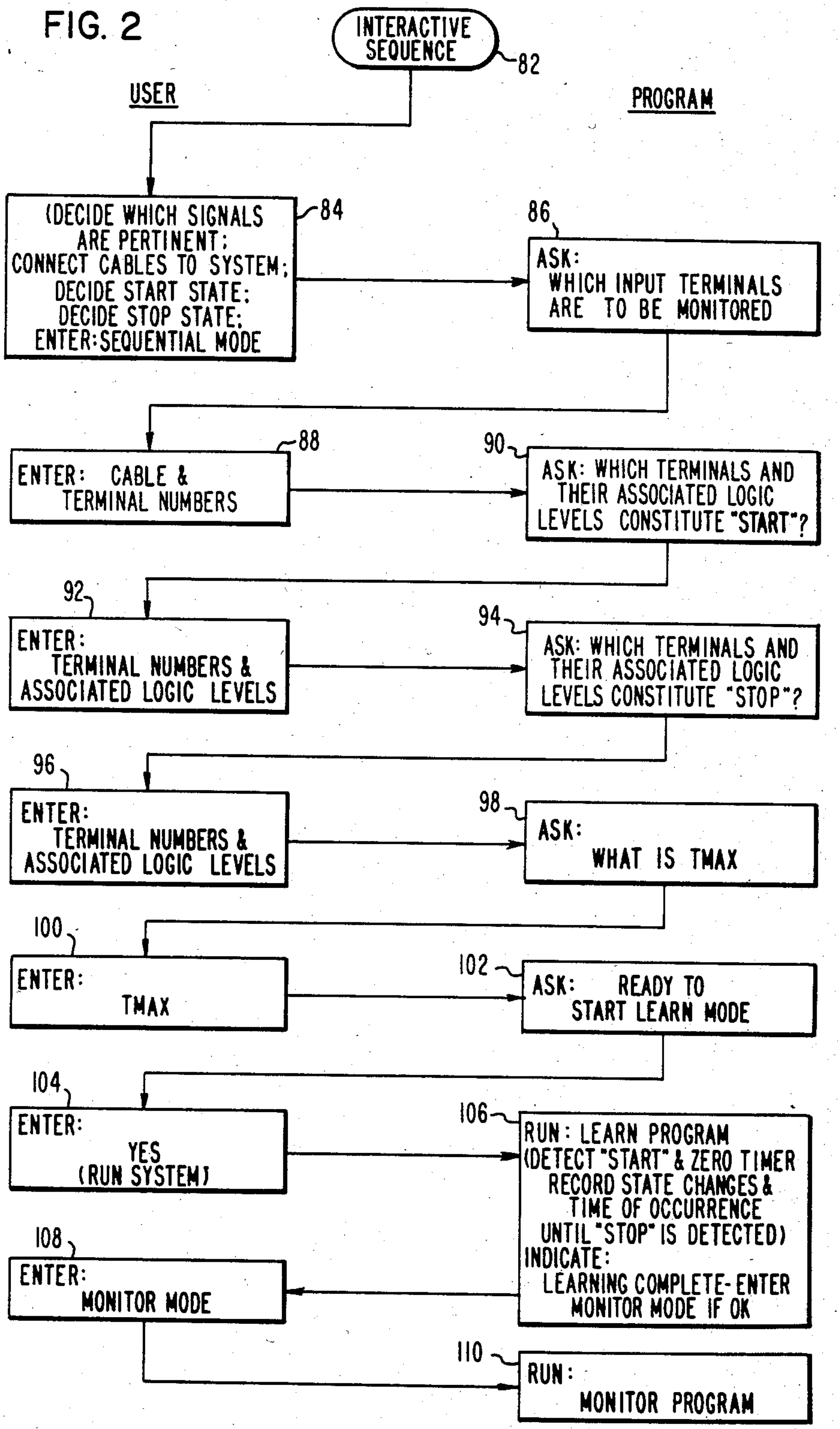
FIG. 2 is a block diagram of an interactive sequence which may be used to devolop the information required by the new and improved monitoring method.

Section 64 of monitoring apparatus 12 includes a program for entering information into section 62 of apparatus 12. A block diagram setting forth the details of this interactive program is shown in FIG. 2. The sequential monitoring mode is selected by an appropriate input via the keyboard and the program directs an interactive exchange between the user and program, with the video monitor 68 for example, conveying information from the program to the user. The video monitor may also display the entered information in order to confirm to the user that it has been correctly entered. After the desired information has been entered by the user and verified, section 64 of the monitoring apparatus 12 may be disconnected from section 62 and removed from the building for use with other monitoring sections 62 in other buildings.

Referring now to the interactive sequence of FIG. 2, which starts at input 82, block 84 indicates that the user selects the sequential monitoring mode via the keyboard. Block 84 also indicates the thought process which the user goes through prior to entering the selection of the sequential mode. For example, if the user is trouble shooting the elevator car starting sequence of a specific car, or verifying that the car starting sequence is correctly adjusted, or simply trying to learn the process, the signals pertinent to the car starting sequence would first be determined. For example, if a hall call is entered into the system, the elevator car selected to answer the call gets ready to make a run, assuming that the elevator car is not located at the floor where the car is entered. In the solid state elevator system of the hereinbefore mention U.S. patents, logic signal $\overline{ACCX}$ from the car controller goes low to request acceleration at the start of a run. Logic signal $\overline{DGU}$ from the car controller goes low to drive the "go up" interface relay. The motor field builds up, and the up direction relay picks. The motor armature voltage is applied, the brake controller is activated, the armature current starts to increase, the brake signal goes high to start to lift the mechanical brake, and the brake monitor signal goes low when the brake actually lifts. The above-mentioned function may occur sequentially in the recited order, and signals indicating the state of each function are readily selectable from the drive motor control loop and car controller. The user then connects the electrical leads from the cables 78 and 80 to the locations in the elevator system 10 which will provide the pertinent signals.

The user now decides if the complete sequence is to be monitored, or a selected part of the sequence. Once this is decided, the user decides which of the pertinent signals are to be used, and their states, which signify when monitoring is to begin. In like manner, the user decides which of the pertinent signals, and their states will signify the end of the monitoring period. For purposes of simplicity, the sequence to be monitored will be referred to as an event. Thus, the user defines unique event starting and stopping conditions in terms of at least certain of the signals the user decided was pertinent to the sequence to be monitored. Any number of the pertinent signals may be used to signify the start of the event, and any number of the pertinent signals may be used to signify the stop of the event. Once the event starting condition is detected, the states of all of the pertinent signals will be followed and stored. Each change in the pertinent signals creates a new state of binary ones and zeroes which create a binary image of each state, and all of the states collectively from a binary image of each event.

Returning to FIG. 2 and step 84, once the user selects the sequential monitoring mode, the program, in step 86, asks the user to identify which input terminals are to be monitored. While only two cables are shown in FIG. 1, any number of cables, each having a plurality of leads may be used. For example, if leads numbered 1-8 of cable number 1 and leads numbered 9–16 of cable number 3 had been connected to receive 16 pertinent elevator signals, the cable and associated lead numbers would be input by the user in step 88. FIG. 3 is a RAM map illustrating how the leads to be montiored may be arranged in memory.

Step 90 then asks the user to input the unique event starting condition. For example, if the leads numbered 1 and 7 of cable number 1 and the leads numbered 9 and 15 of cable number 3 are connected to the signals which are to be used to define the start of the event, these cable and terminal members would be input, as indicated in block 92, along with the logic level of each signal. The RAM map of FIG. 3 may store the unique event starting condition as indicated, setting forth an example wherein the leads numbered 1 and 7 of cable number 1 are to be a logic one and a logic zero, respectively, and the leads numbered 9 and 15 of cable number 3 are to be a logic zero and a logic one, respectively.

In like manner, step 94 asks the user to input the unique event stopping condition, and block 96 indicates that the user inputs the cable and lead numbers, along with their associated logic levels. FIG. 3 sets forth an example for the event stopping condition which includes the leads numbered 3 and 8 of cable number 1 being a logic one and a logic zero, respectively and the leads numbered 12 and 16 of cable number 3 being a logic zero and a logic one, respectively.

The interactive program then asks the user in block 98 to input TMAX. If the unique event stopping condition is unduly delayed, or does not occur for some reason, the monitoring system may get hung up waiting for an event to be terminated. Thus, the user determines how long the sequence to be monitored should last when it is executed correctly, and TMAX is selected to be a value which is sufficiently longer than this normal cycle time so that abnormally long events may still be measured, but short enough that subsequent "start" states are not missed, in case the event aborts without the normal "stop" state occurring. The user enters the value for TMAX, as indicated in block 100, and the program will then use the value of TMAX to end an event, if this time value is reached before the unique event stopping condition is detected.

The interactive program then asks, as indicated in block 102, if the user is ready to start a learning mode of the monitoring method. The user enters "yes", as indicated in block 104, and the user then operates the elevator system, at least through the sequence to be monitored. The monitoring system runs the "learn" program as indicated in block 106. A flow chart of a suitable program for performing the learning mode is set forth in FIG. 4. In general, the learning mode detects the unique event starting condition, it zeroes a timer, and it follows each change in state of the monitored signals, creating a new state for each change in the monitored signals, until the unique event stopping condition is detected. The zeroed timer starts running when the unique event starting condition is detected, and the time of each state change is stored. Thus, the time value associated with each state change indicates the time of this state change relative to the start of the event. The program then indicates to the user that the learning mode has been completed, and it may give the user a chance to verify that the elevator system operated correctly through the learning mode. If the elevator system operated correctly, the user indicates this in block 108, such as by entering "monitoring mode". The program then switches to the monitoring mode, indicated in block 110, in which it runs a program, such as set forth in detail by the flow chart in FIG. 7. If the elevator system did not operate correctly, the user returns the monitor to block 104.

Figure 4:
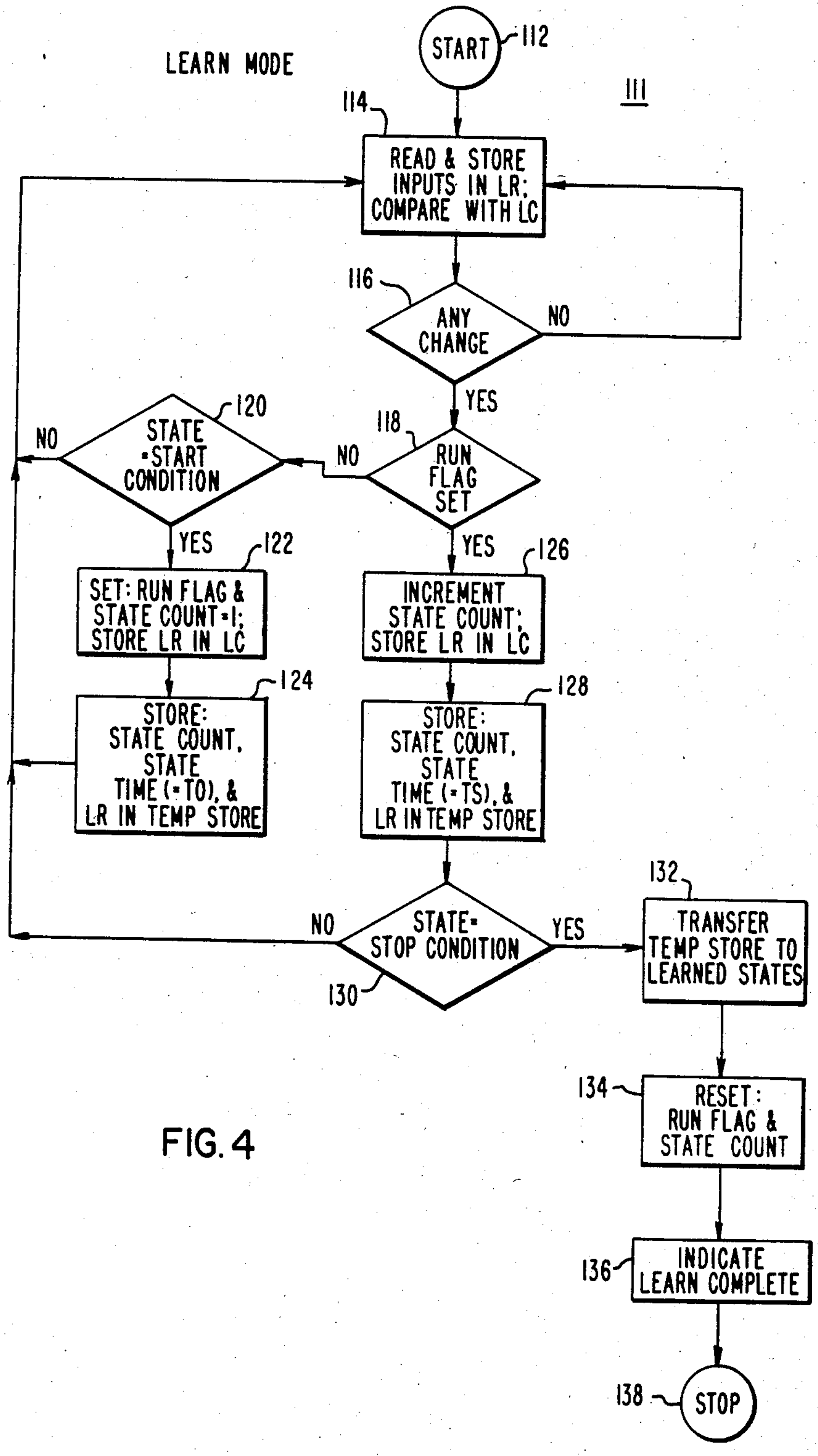
FIG. 4 is a detailed flow chart of a program which may be used during a learning mode of the invention.

A detailed exemplary flow chart of a program 111 for performing the learning mode is set forth in FIG. 4. The program is entered at 112 and step 114 reads and stores all of the inputs, i.e., the conditions of the pertinent signals, in a temporary location in a random access memory (RAM) which will be referred to as LR, as being the latest reading of input signals. Block 114 also compares the latest reading stored at location LR with the conditions of the input signals stored in a memory location LC, representing the last change of state detected. Locations LR and LC are set forth ina RAM map shown in FIG. 5. After the comparison of the latest reading LR with the last change LC, the program advances to step 116 which determines if there has been a change in the signals. If there has been no change, the program loops back to step 114 to repeat the functions described relative thereto, and the program stays in this loop until step 116 detects a change in the input signals. When a change has been detected, the program advances to step 118 which checks to see if a run flag has been set. The run flag is also indicated in the RAM map of FIG. 5. At this stage of the program, the run flag will not have been set, and the program advances to step 120 which compares the state of the signals with the unique event starting condition as set forth in the RAM map of FIG. 3. If the new state of the input signals does not match the unique event starting condition, step 120 returns to step 114. The program will continue to ignore all state changes until step 120 finds that a state change matches the unique event starting condition defined by the user.

When the unique event starting condition is detected, step 120 advances to step 122 which sets the run flag, hereinbefore referred to, it sets a counter, referred to as a state counter and shown in the RAM map of FIG. 5, to a value of one, and it stores the latest reading LR in the last change location LC. Step 124 stores the state count, which is a one, in this instance, and it stores a state time of zero. It also zeros the state timer, shown in the RAM map of FIG. 5, which timer is periodically updated by a timing program. Step 124 then returns to step 114.

The next time step 116 finds that there has been a change in the input signals, step 118 will now find that the run flag has been set, and the program branches to step 126 which increments the state count, and it stores the last reading LR in location LC. Step 128 stores the state count, it reads the state timer and stores the value thereof adjacent to the stored state count, and it stores the binary value of LR in the temporary storage shown in the RAM map of FIG. 6. The value of the state time would be stored in binary form, represented by ones and zeroes, but in the RAM map of FIG. 6 it is shown in decimal form as minutes, seconds, and hundreds of a second, in order to simplify the RAM map.

Step 128 then proceeds to step 130 to see if the present state matches the unique user defined event stopping condition stored in the RAM of FIG. 3. If step 130 does not find the four inputs associated with the event stopping condition to have the logic levels indicated in FIG. 3, the program returns to step 114. The program then continues, sequentially building up binary images of each state, as set forth in the RAM map of FIG. 6 until step 130 detects the unique user defined event stopping condition. The program then branches to step 132 which transfers the binary image of the event from the temporary storage location to a location referred to as "learned states". Step 134 resets the run flag and state count, and step 136 indicates to the user that the learning mode has been completed. The learning mode ends at exit 138. While FIG. 6 shows only the inputs associated with the stopping and starting conditions changing, other inputs may also change. If they do, their changes will also be detected and stored as state changes.

Figure 7:
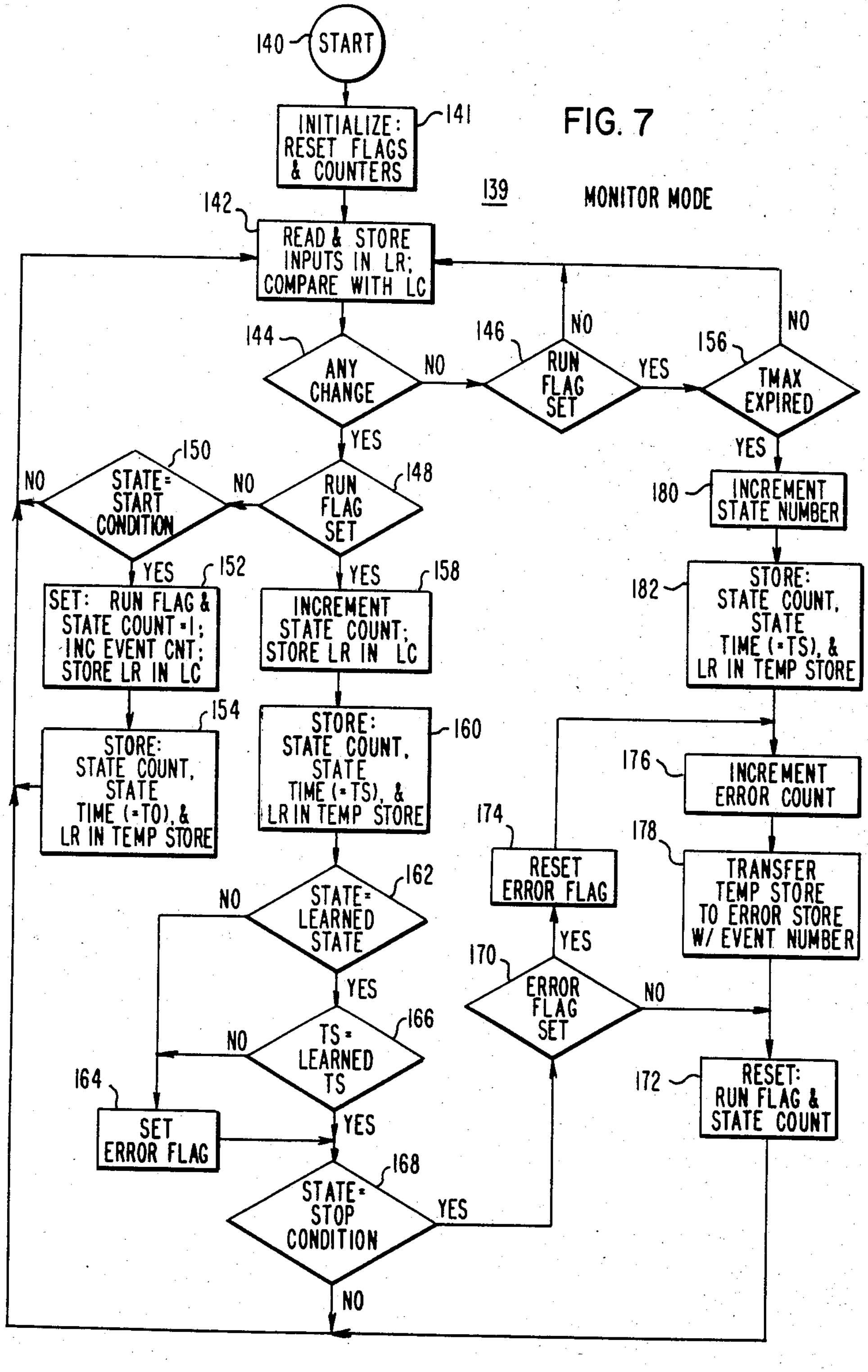
FIG. 7 is a detailed flow chart of a program which may be used during a monitoring mode of the invention, for monitoring an operating elevator system.

Once the learning mode has been completed, the elevator system may be placed in normal operation, and the monitoring apparatus will run the program 139 of the monitoring mode set forth in FIG. 7. This program is started at 140, and step 141 initializes the system, such as by resetting the various flags and counters. Step 142 reads and stores the inputs in location LR, and it compares the binary value with the last change reading stored at location LC. Step 144 checks to see if the comparison performed in step 142 found a change in the input signals, and if no change is found the program goes to step 146 which checks to see if a run flag is set. At this point, the run flag will not have been set, and the program returns to step 142, which then loops through steps 142, 144 and 146 until step 144 detects a change in the input signals. When a change is detected, the program branches to step 148 which checks to see if the run flag is set. At this point, the run flag will not have been set and the program goes to step 150 which checks to see if the present state of the input signals matches the event starting condition. If it does not, the program loops back to step 142, and the state changes are ignored until step 150 finds that the state of the signals matches the event starting condition. When the event start is detected, step 150 proceeds to step 152, which sets the run flag, and it sets the state counter to one. Step 152 also increments the counter in RAM shown in FIG. 5, referred to as the event counter, and step 152 also stores the value at location LR in storage location LC. Thus, each occurrence of the sequence to be monitored is counted in the event counter, and events which contain an error will be identified by their specific number. Step 154 then stores the state count and the value located at location LR in a location in memory referred to as temporary store, such as shown in the RAM maps of FIGS. 8 and 9. The time of this state, which is state number 1, is zeroed, and the state timer in the RAM map of FIG. 5 is zeroed, to time the present event. Step 154 then returns to step 142.

The next time a change is detected in the input signals, step 148 will find that the run flag is set, and the program branches to step 158 which increments the state counter, and it stores the latest reading LR in location LC. Step 160 stores the state count, the state time, determined by the state timer, and LR in the temporary store, as indicated in the RAM maps of FIGS. 8 and 9.

Step 162 then compares the present state of inputs with the learned state shown in FIG. 6, comparing the same state numbers. In other words, if the present state is state number 2 it will compare the status of the inputs with the learned state number 2 of FIG. 6. If step 162 finds that the states do not match, there has been a sequence error and step 164 sets an error flag, also shown in the RAM map of FIG. 5. If step 162 finds that the compared states match, step 166 checks to see if the occurrence time of this state is the same as the occurrence time of the learned state. A predetermined tolerance may be build into this comparison by ignoring a predetermined number of the least significant bits of the binary value of the occurrence time. If step 166 finds that the occurrence time of this state does not match the occurrence time of the like position state in the correct image stored in FIG. 6, step 166 will advance to step 164 which sets the error flag. Steps 164 and the yes branch of step 166 both advance to step 168, which checks the present state to see if it matches the unique user defined event stopping condition. If it does not, the program returns to step 142. Thus, each state change will be built up in the temporary store of the RAM map of FIGS. 8 or 9, until step 168 detects that the state being considered matches the event stopping condition set forth in FIG. 3. Step 168 advances to step 170 when the stop condition is detected, with step 170 checking to see if the error flag shown in the RAM map of FIG. 5 is set. If the error flag is not set, there has been no error detected relative to the present event, and step 170 proceeds to step 172, which resets the run flag and state count. Step 172 then proceeds back to step 142, and the event, while it has been counted on the event counter, is erased from the temporary store, and the next event is stored at this location.

If step 170 finds that the error flag is set, indicating that there has been an error detected in the present event, step 170 advances to step 174 which resets the error flag and step 174 goes to step 176 which increments an error counter, with the error counter being set forth in the RAM map of FIG. 5. Step 176 then proceeds to step 178 which transfers the binary image of the event located at the temporary store, to a location referred to as the error store, along with the event number, which is obtained from the event counter. If the present event is the event set forth in the RAM map of FIG. 8, the error store would appear exactly the same as the temporary store shown in FIG. 8. As set forth in the RAM map of FIG. 8, a sequence error occurs in state 6, and this error may be indicated with an asterisk as illustrated in FIG. 8. The state 7 shown in FIG. 8 does not occur at the same time as state 7 in the learned states shown in FIG. 6, and this timing error may also be indicated with an asterisk along side of state number 7, also as indicated in FIG. 8.

Each time no change has been detected in step 144, the program proceeds to step 146 which checks to see if the run flag is set. After the run flag has been set, the program goes from step 146 to step 156, which checks the state timer to see if TMAX has expired. If the value of TMAX has not been reached, step 156 returns to step 142. When step 156 finds that the value of TMAX has been reached, step 156 advances to step 180, which increments the state number, and step 182 stores the state count, the state time, which in this instance will be equal to TMAX, and it also stores the binary value located at LR in the temporary store. Step 182 advances to step 176, which increments the error count, since reaching the value of TMAX before the event stopping condition has been reached indicates a malfunction or error, and step 176 transfers the binary image of the event located at the temporary store to the error store location, along with the number of the event obtained from the event counter. Step 172 then resets the run flag and state count, and the program returns to step 142, to look for the next event.

The RAM map shown in FIG. 9 illustrates an event in which the value of TMAX is reached before step 168 detects the event stopping condition. An asterisk may be placed next to state 9, which indicates the state where the error occurred.

Figure 10A:
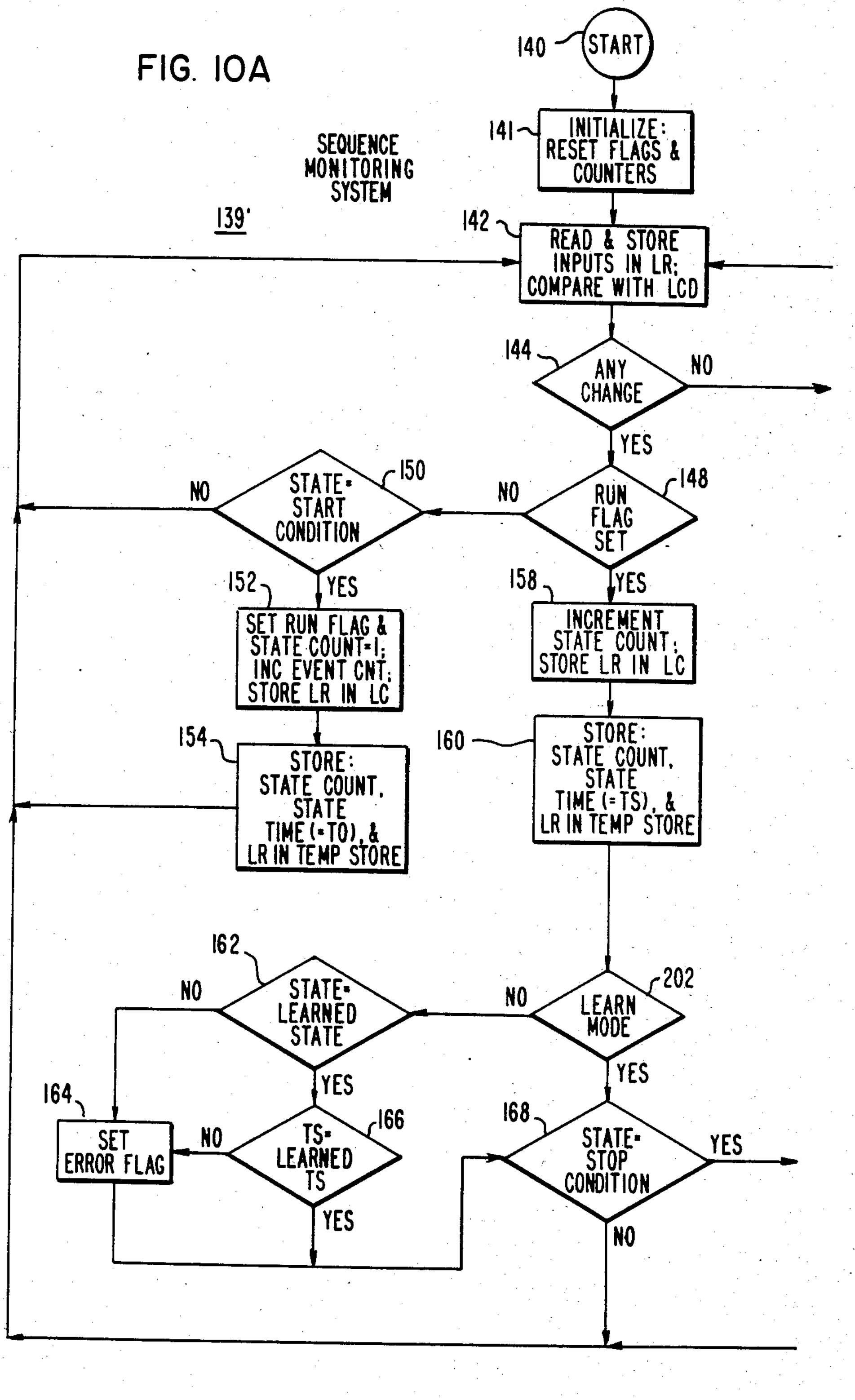
FIGS. 10A and 10B may be combined to provide a detailed flow chart of a program which combines the learn and monitor modes of FIGS. 4 and 7 into a complete sequence monitoring system.
Figure 10B:
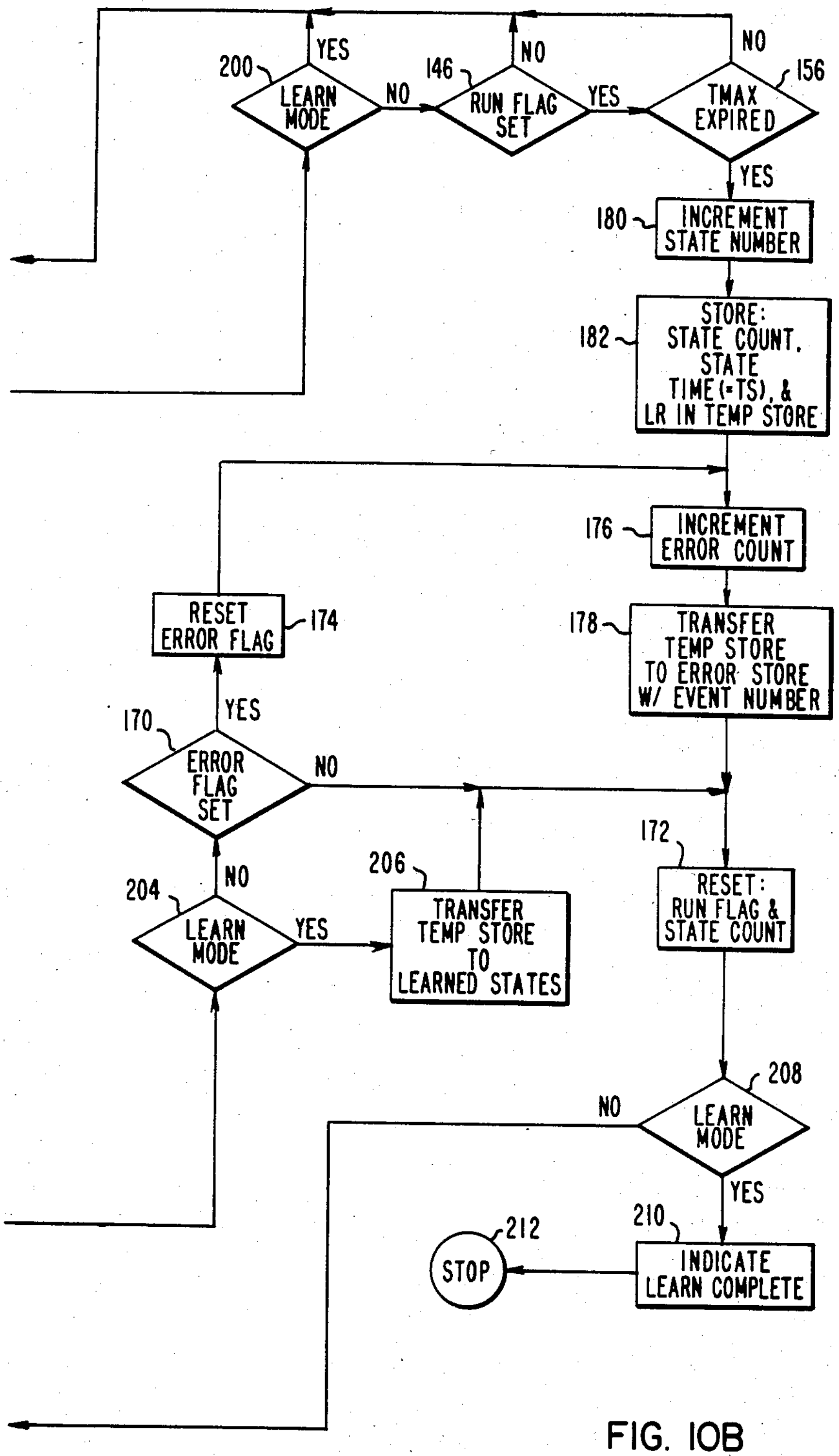

The learning and monitoring modes have been described as separate programs, for ease of explanation, but in actual practice the two modes may be combined into a single sequence monitoring system, as set forth by the program 139' shown in FIG. 10. The flow chart set forth in FIG. 10 is similar to the flow chart 139 set forth in FIG. 7, except for the addition of seven new steps, and thus only the new steps will be described in detail. When step 144 finds there has been no change in the input signals, instead of proceeding directly to step 146, a new step 200 has been added which checks to see if the program is in the learning mode. If the program is in the learning mode, step 200 returns the program to step 142. If the program is not in the learning mode, step 200 proceeds to step 146.

Step 160, instead of proceeding directly to check for errors, now proceeds to a step 202 which checks to see if the program is in the learning mode. If it is in the learning mode, the error checking steps of 162, 164 and 166 are bypassed, and the program proceeds from step 202 to step 168. If the program is not in the learning mode, step 202 proceeds to the error checking steps.

When step 168 finds that the event stopping condition has been detected, instead of proceeding directly to step 170, it proceeds to a step 204 which checks to see if the program is in the learning mode. If it is in the learning mode, step 204 proceeds to step 206 which transfers the temporary store to the location referred to as learned states, shown in FIG. 6. Step 206 then proceeds to step 172. If step 204 finds that the program is not in the learning mode, it proceeds to step 170.

Step 172, instead of proceeding back to step 142, as in FIG. 7, now proceeds to a step 208 which checks to see if the program is in the learning mode. If it is in the learning mode, step 208 proceeds to a new step 210 which indicates to the user that the learning mode has been completed, and the program stops at 212, until the user indicates that the sequence monitoring system 139' should again be started. If step 208 finds that the program is not in the learning mode, step 208 returns to step 142 to monitor the system for the next occurrence of the defined event.

In summary, there has been disclosed a new and improved method of monitoring an elevator system, which is universal and flexible in that it can be applied to any selected portion of an elevator system without any predetermined knowledge of the specific functions, sequences and relative times of the functions. The learning mode aspect of the new and improved method quickly forms a correct binary image of the sequence to be monitored, and the elevator system will thereafter ignore all state changes of the pertinent signals, until the unique user defined event starting condition is detected. The method then counts and discards all correct sequences of each monitored event, until a sequence and/or timing error in the event is detected. The whole sequence is then stored for diagnostic purposes, with the stored events which contain errors being displayed upon the CRT, upon request, and/or printed out by the printer, as desired.

We claim as our invention:

1. A method of monitoring an operating elevator system for a malfunction related to predetermined sequentially performed functions, comprising the steps of:

providing binary logic signals having one of two logic levels from an elevator system which are pertinent to a predetermined sequence of functions to be monitored for a malfunction, storing unique user defined event starting and stopping conditions which define the start of an event and the end of an event, respectively, in terms of the logic levels of at least certain of said binary logic signals, detecting when each of said binary logic signals changes logic levels, with each such change being a state change of the event, providing a correct binary image of the event by the steps of:

detecting the occurrence of the unique user defined event starting and stopping conditions while the elevator system is operated to correctly perform the sequence to be monitored, storing the logic levels of all of the binary logic signals upon each state change which occurs between the detection of the unique event starting and stopping conditions, and timing each event to detect the occurrence time of each state change relative to the start of the event, and monitoring the operation of the elevator system by providing binary images of said event each time said event occurs, with said monitoring step including the steps of:

detecting the occurrence of the unique user defined event starting and stopping conditions while the elevator system is in operation, storing the logic levels of all of the binary logic signals upon each state change and timing each event to detect the occurrence time of each state change relative to the start of each event, to provide a temporary binary image of the event, comparing each temporary binary image with the correct binary image to detect differences, and storing a temporary image for diagnostic purposes when the comparing step detects a difference between the temporary binary image and the correct binary image.

2. The method of claim 1 wherein the step of comparing a temporary binary image with the correct binary image sequentially compares each state change of the temporary binary image as it occurs, with a predetermined state change of the correct binary image, to detect a sequence error.

3. The method of claim 1 wherein the step of comparing a temporary binary image with the correct binary image sequentially compares each state change of the temporary binary image as it occurs, with a predetermined state change of the correct image, to detect a timing error.

4. The method of claim 1 including the steps of:

providing a predetermined maximum time TMAX, the value of which is not exceeded by a correct event, comparing the time each state change occurs with TMAX, and terminating an event prior to the detection of the unique event stopping condition, when the comparing step indicates TMAX as elapsed.

5. The method of claim 1 including the step of counting the number of differences between a temporary binary image and the correct binary image when the step of comparing each temporary binary image with the correct binary image detects a difference.

6. The method of claim 1 including the steps of counting and sequentially numbering the events as they are detected, and wherein the steps of storing a temporary binary image of an event for diagnostic purposes includes storing the number of the event.

7. The method of claim 1 wherein the step of storing a temporary binary image for diagnostic purposes includes the step of indicating each state change that is different either in time of occurrence or in the logic levels of the binary logic signals, than the time of occurrence or the logic levels of the state changes of the correct binary image.

* * * * *